United States Patent [19]

Gruber et al.

[11] 4,169,925
[45] Oct. 2, 1979

[54] MANUFACTURE OF OLEFIN POLYMERS

[75] Inventors: Wolfgang Gruber, Frankenthal; Hans Frielingsdorf, Bad Durkheim; Robert Bachl, Worms; Guenther Schweier, Ludwigshafen, all of Fed. Rep. of Germany

[73] Assignee: BASF Aktiengesellschaft, Fed. Rep. of Germany

[21] Appl. No.: 901,196

[22] Filed: Apr. 28, 1978

[30] Foreign Application Priority Data

May 20, 1977 [DE] Fed. Rep. of Germany ....... 2722955

[51] Int. Cl.$^2$ .......................... C08F 4/26; C08F 4/24; C08F 10/00; C08F 10/02
[52] U.S. Cl. ...................................... 526/96; 252/458; 252/470; 526/97; 526/99; 526/105; 526/106; 526/352
[58] Field of Search ..................... 526/96, 97, 99, 105, 526/106

[56] References Cited

U.S. PATENT DOCUMENTS

| 3,879,362 | 4/1975 | Chalfont et al. | 526/96 |
| 4,037,042 | 7/1977 | Mueller-Tamm et al. | 526/106 |
| 4,092,468 | 5/1978 | Gruber et al. | 526/106 |

FOREIGN PATENT DOCUMENTS

| 253518 | 5/1963 | Australia | 526/99 |
| 2525511 | 1/1976 | Fed. Rep. of Germany | 526/96 |

*Primary Examiner*—Alan Holler
*Attorney, Agent, or Firm*—Keil & Witherspoon

[57] ABSTRACT

A process for the manufacture of olefin polymers by polymerizing α-monoolefins at relatively low temperatures and relatively low olefin pressures by means of a catalyst obtained from a silicate carrier (component a), an aluminum compound (component b) and a chromium compound (component c). The catalyst is obtained by (1) in a first stage, initially (1.1) charging a particular silicate carrier (component a) with (1.2) a mixture of (1.2.1) an aluminum salt or a mixture of an aluminum salt with up to 80 mole%, based on the salt mixture, of a nickel-II salt (component b) and (1.2.2) a chromium compound (component c), this compound being chromium trioxide or a compound which is converted to chromium trioxide under the conditions of stage (2), by treatment with a solution of the mixture (1.2), and (2), in a second stage then maintaining the product, obtained from stage (1), for a certain time at a high temperature in an anhydrous oxygen-containing gas stream. The process may be used to produce polymers having a relatively broad molecular weight distribution.

5 Claims, No Drawings

MANUFACTURE OF OLEFIN POLYMERS

The present invention relates to a process for the manufacture of olefin polymers by polymerizing α-monoolefins of 2 to 8 carbon atoms at from 60° to 160° C. under olefin pressures of from 0.5 to 40 bars by means of a catalyst which is obtained from a silicate carrier (component a), an aluminum compound (component b) and a chromium compound (component c).

A plurality of embodiments of a process of this type are known; a feature common to these processes is that the component (b) in the catalyst used serves to give a catalyst containing functional alkoxide groups. The purpose of the alkoxide groups is, for example, to regulate the molecular weight of the polymers (cf. German Laid-Open Applications DOS Nos. 2,240,246 and 2,329,738 and U.S. Pat. No. 3,324,101) and to modify the activity of the catalyst (cf. German Laid-Open Application DOS No. 1,926,346) or to influence the memory effect of the polymers (cf. German Published Application DAS No. 2,052,573).

It is an object of the present invention to provide a catalyst for the above process which makes it possible to obtain polymers of relatively broad molecular weight distribution which are suitable for conversion to paper-like films and to moldings free from melt fracture.

We have found that this object is achieved by providing a catalyst which is obtained by charging a particular silicate carrier (a) with a mixture of a particular aluminum compound (b) and a particular chromium compound (c) and heating the resulting product at a high temperature in an oxygen-containing gas stream.

Accordingly, the present invention relates to a process for the manufacture of an olefin polymer by polymerizing an α-monoolefin of 2 to 8 carbon atoms at from 60° to 160° C., especially from 80° to 110° C., and at an olefin pressure of from 0.5 to 40 bars, especially from 4 to 15 bars, by means of a catalyst which is obtained from a silicate carrier (component a), an aluminum compound (component b) and a chromium compound (component c), wherein the catalyst used is obtained by
(1) initially
(1.1) charging a finely divided xerogel (component a) of the formula

$SiO_2 \cdot mAl_2O_3$ where m is a number from 0 to 2, especially from 0 to 0.5, this xerogel having a particle diameter of from 20 to 2,000 μm, especially from 40 to 300 μm, a pore volume of from 0.7 to 2.6 cm$^3$/g, especially from 1 to 2.5 cm$^3$/g, and a surface area of from 150 to 600 m$^2$/g, especially from 300 to 600 m$^2$/g, with
(1.2) a mixture of
(1.2.1) an aluminum salt, in particular aluminum nitrate, or a mixture of an aluminum salt, in particular aluminum nitrate, with up to 80 mole%, based on the salt mixture, of a nickel-II salt, in particular nickel-II nitrate, (component b) and
(1.2.2) a chromium compound (component c), which compound is chromium trioxide or a compound which is converted to chromium trioxide under the conditions of stage (2),
by thoroughly mixing with a solution of the mixture (1.2) and evaporating off the solvent and
(2) then maintaining the product obtained from stage (1) for from 10 to 400 minutes, especially from 60 to 300 minutes, at from 600° to 1,000° C., especially from 700° to 950° C., in an anhydrous gas stream containing oxygen at a concentration of more than 10 percent by volume,
with the proviso that the catalyst contains from 0.1 to 10 parts by weight, especially from 0.5 to 5 parts by weight, of component (b) (calculated as aluminum or aluminum plus nickel) and from 0.3 to 10 parts by weight, especially from 1 to 5 parts by weight, of component (c) (calculated as chromium trioxide) per 100 parts by weight of component (a) (calculated as silica).

The following should be noted in respect of the novel catalyst to be employed in the process according to the invention.

The catalyst is manufactured in two stages, referred to as (1) and (2), both above and in the text which follows.

(1) First stage

In this first stage, the silicate carrier (1.1) component a) is charged with the mixture (1.2) of the aluminum compound, or the aluminum compound and the nickel compound (component b), and the chromium compound (component c).

An example of an advantageous method for this stage is the following: the starting material is the carrier (1.1) as such or as a suspension containing from 5 to 20, preferably from 10 to 15, percent by weight of the carrier (1.1), and a solution containing from 0.1 to 20, preferably from 0.5 to 12, percent by weight of the mixture (1.2); the solvent used should in each case contain not more than 20, preferably not more than 5, percent by weight of water. The components are combined, in general by adding the mixture component to the carrier component, since this is more practical than the converse, though the latter is also feasible. After combining the components, the solid phase is isolated by evaporating the volatile constituents (solvents) whilst constantly intimately mixing the material being treated, in order to ensure its homogeneity. This stage may for example be carried out on a rotary evaporator operated at a pressure of from 1 to 760 mm Hg. The presence of some residual moisture (not more than 20, and especially not more than 10, percent by weight of volatile constituents, based on the carrier) in the product obtained from stage (1) is not critical.

(2) Second stage

This stage serves to activate the catalyst; it can be carried out in the relevant conventional manner, i.e. in particular under conditions which ensure that in the finished catalyst the chromium is, at least partially, present in the hexavalent stage. Appropriate procedures are described, for example, in German Laid-Open Application DOS No. 1,520,467, page 3, line 11, to page 4, line 3.

It may be noted that essentially the novelty of the process of the invention resides in the novel catalyst employed.

Taking this aspect into account, the process can in other respects be carried out in virtually all the relevant conventional industrial embodiments, e.g. as a batchwise, cyclic or continuous process which may be, for example, a suspension, solution or dryphase polymerization process, though the first and last of these offer the greatest advantage. The above industrial embodiments, i.e. the industrial embodiments of the Phillips olefin polymerization, are well known from the literature (cf., for example, the basic content of German Pat. No. 1,051,004 and the further developments thereof which have been disclosed) and from industrial practice, so that further comments are superfluous.

It should, however, be noted that the novel process is suitable for the homopolymerization and copolymerization of α-monoolefins, especially of α-monoolefins of 2 to 6 carbon atoms; it is particularly suitable for the manufacture of ethylene homopolymers. Where it is used to manufacture copolymers of ethylene with higher α-monoolefins, or to manufacture homopolymers of higher α-monoolefins, the higher α-monoolefins are especially propene, 1-butene, 4-methyl-1-pentene, 1-hexene and 1-octene.

It should also be noted that in the process of the invention the molecular weight of the polymers can advantageously be regulated by relevant conventional methods, e.g. by using hydrogen as a molecular weight regulator and/or by lowering the partial pressure of the monomer or monomers. A further advantage achievable in polymerizations using the novel catalysts is that catalysts of high productivity can be obtained. In that case, the proportion of catalyst in the polymer is so low that it does not interfere and its removal, which would require a separate process step, is in general unnecessary.

The following details with regard to the material composition of the novel catalysts may be noted:

The silicate carrier employed is in general an aluminosilicate or especially a silica; it is important that the material should conform to the required parameters and should be very dry (no further weight loss after 6 hours at 160° C. under a pressure of 2 mm Hg). The carrier can advantageously be a xerogel which has been produced by the method described in German Laid-Open Application Dos No. 2,411,735. The aluminum compounds employed, and the nickel compounds which may or may not be employed, are inorganic or organic salts, preferably salts which are soluble in relatively volatile organic solvents, i.e. solvents boiling at below 90° C. under atmospheric pressure. Examples of suitable salts are the nitrates, e.g. aluminum nitrate nonahydrate and nickel-(II) nitrate hexahydrate. The chromium compounds to be employed are especially chromium trioxide and soluble salts of trivalent chromium with an organic or inorganic acid, e.g. the acetate, oxalate and nitrate; those salts, of this type of acid, which on activation are totally converted to chromium trioxide are particularly suitable. Chromium compounds can also be employed in the form of chelates, e.g. chromium acetylacetone. Suitable solvents are especially alkanols of 1 to 5 carbon atoms, e.g. tert.-butanol, i-propanol and ethanol, as well as alkanones of 3 to 6 carbon atoms, e.g. acetone, and also hydrocarbons.

EXAMPLE (A) Manufacture of the novel catalyst (1) First stage 4.16 g of aluminum nitrate nonahydrate and 11.53 g of chromium-(III) nitrate nonahydrate are dissolved in 300 g of ethanol. This solution is combined with 100 g of a finely divided xerogel, of the formula $SiO_2$, which has a particle diameter of from 30 to 300 μm, a pore volume of 1.0 cm$^3$/g and a surface area of 450 m$^2$/g.

The components are combined at room temperature by first introducing the carrier into the flask of a rotary evaporator and then adding the solution of the aluminum nitrate and chromium nitrate. The mixture is then evaporated to dryness at not more than 80° C., with the pressure being reduced to about 10 mm Hg, with thorough mixing by means of the rotary evaporator.

(2) Second stage

To activate the product obtained from stage (1), it is kept at 850° C. in an anhydrous stream of oxygen for 120 minutes.

The resulting catalyst contains, per 100 parts by weight of component (a) (calculated as silica), 1.5 parts by weight of component (b) (calculated as aluminum) and 2 parts by weight of component (a) (calculated as chromium trioxide).

(B) Polymerization 3,200 g of anhydrous pentane and 0.5 g of the novel catalyst are introduced into a stirred kettle having a useful volume of 10 liters. The polymerization is carried out for 2 hours at 102° C. under a total pressure of 35 bars which is kept constant by injecting further monomer. Ethylene is employed as the monomer.

Per g of catalyst, 5,610 g of polyethylene are obtained in 2 hours; the polymer has an MFI 190-20 (measured according to ASTM 1238-65 T) of 16 g/10 min, whilst the $MFI_{21.6}:MFI_{2.16}$ ratio is 145.

We claim:

1. A process for the manufacture of an olefin polymer by polymerizing an α-monoolefin of 2 to 8 carbon atoms at from 60° to 160° C. and at an olefin pressure of from 0.5 to 40 bars by means of a catalyst which is obtained from a silicate carrier (component a), an aluminum compound (component b) and a chromium compound (component c), wherein the catalyst employed is obtained by
    (1) initially
        (1.1) charging a finely divided xerogel (component a) of the formula $SiO_2 \cdot mAl_2O_3$ where m is a number from 0 to 2, this xerogel having a particle diameter of from 20 to 2,000 μm, a pore volume of from 0.7 to 2.6 cm$^3$/g and a surface area of from 150 to 600 m$^2$/g, with (1.2) a mixture of
        (1.2.1) aluminum nitrate or a mixture of aluminum nitrate with up to 80 mole%, based on the mixture, of a nickel-II nitrate (component b) and
        (1.2.2) a chromium compound (component c), which compound is chromium trioxide or a compound which is converted to chromium trioxide under the conditions of stage (2),
    by thoroughly mixing with a solution of the mixture (1.2) and evaporating off the solvent and
    (2) then maintaining the product obtained from stage (1) for from 10 to 400 minutes at from 600° to 1,000° C. in an anhydrous gas stream containing oxygen at a concentration of more than 10 percent by volume,
with the proviso that the catalyst contains from 0.1 to 10 parts by weight of component (b) (calculated as aluminum or aluminum plus nickel) and from 0.3 to 10 parts by weight of component (c) (calculated as chromium trioxide) per 100 parts by weight of component (a) (calculated as silica).

2. The process of claim 1, wherein the xerogel has a particle diameter of from 40 to 300 μm, a pore volume of from 1 to 2.5 cm$^3$/g and a surface area of from 300 to 600 m$^2$/g.

3. The process of claim 1, wherein m in the formula of the xerogel is a number from 0 to 0.5.

4. The process of claim 1, wherein the conditions in stage (2) include a temperature of from 700° to 950° C. and the product from stage (1) is maintained in step (2) for from 60 to 300 minutes.

5. The process of claim 1, wherein the catalyst contains from 0.5 to 5 parts by weight of component (b) and from 1 to 5 parts by weight of component (c) per 100 parts by weight of component (a).

* * * * *